United States Patent
Köpp et al.

(10) Patent No.: US 6,941,486 B1
(45) Date of Patent: Sep. 6, 2005

(54) METHOD AND DEVICE FOR OPTIMIZING THE TRANSMISSION SAFETY AND THE DEFECT TOLERANCE IN HIGH-BIT-RATE DATA NETWORKS

(75) Inventors: Jörg Köpp, München (DE); Andreas Klug, Holzkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/743,689

(22) PCT Filed: Jul. 1, 1999

(86) PCT No.: PCT/DE99/01913

§ 371 (c)(1),
(2), (4) Date: Jan. 12, 2001

(87) PCT Pub. No.: WO00/04672

PCT Pub. Date: Jan. 27, 2000

(30) Foreign Application Priority Data

Jul. 14, 1998 (DE) ................................ 198 31 562

(51) Int. Cl.[7] ............................................. G06F 11/00
(52) U.S. Cl. ....................................................... 714/4
(58) Field of Search ........................... 714/4; 370/227, 370/228

(56) References Cited

U.S. PATENT DOCUMENTS

| | | | |
|---|---|---|---|
| 5,740,157 A * | 4/1998 | Demiray et al. | 370/219 |
| 6,625,115 B1 * | 9/2003 | Ikeda et al. | 370/217 |
| 2003/0012134 A1 * | 1/2003 | Ikawa | 370/227 |

FOREIGN PATENT DOCUMENTS

| | | |
|---|---|---|
| EP | 0 652 658 | 10/1995 |
| EP | 0 824 292 A2 | 2/1998 |
| WO | WO 95/06363 | 2/1995 |

OTHER PUBLICATIONS

Japanese Abstract, Publication No. 09098181, Publication date: Apr. 8, 1997.
Service Protection in the Trunk Network British Telecommunications Engineering 7 (1988) Jul., Part 2, London, Gt. Britian, SChickner, p. 101-109.
Karl Spiess et al.—Erhöhte Betriebssicherheit etc., Telcom report 8 (1985).
Route diversity wit hitless path switching N. Kawase Electronic Letters Nov. 10th, 1994 vol. 30 No. 23.

* cited by examiner

*Primary Examiner*—Bryce P. Bonzo
(74) *Attorney, Agent, or Firm*—Morrison & Foerster LLP

(57) ABSTRACT

The invention relates to a method and to an apparatus for optimizing transmission security and failure security in high-bit-rate data networks by via signal line redundancy between the network nodes, such that parallel signal lines can optionally be occupied, or can be switched, as working lines or protection lines, and selectors, bridge circuits, and interface modules are provided at the network node side. According to the invention, each of the parallel signal lines is connected at the network node side with a respective interface module, and all interface modules are in principle in the active state. Given failure of one of the interface modules, this failure is immediately countered by a signal line changeover, and line errors are immediately countered by the provided interface module redundancy. Furthermore, error messages can be transmitted, via a corresponding link, between the interface modules of the incoming and outgoing parallel signal lines in each of the network nodes.

3 Claims, 2 Drawing Sheets

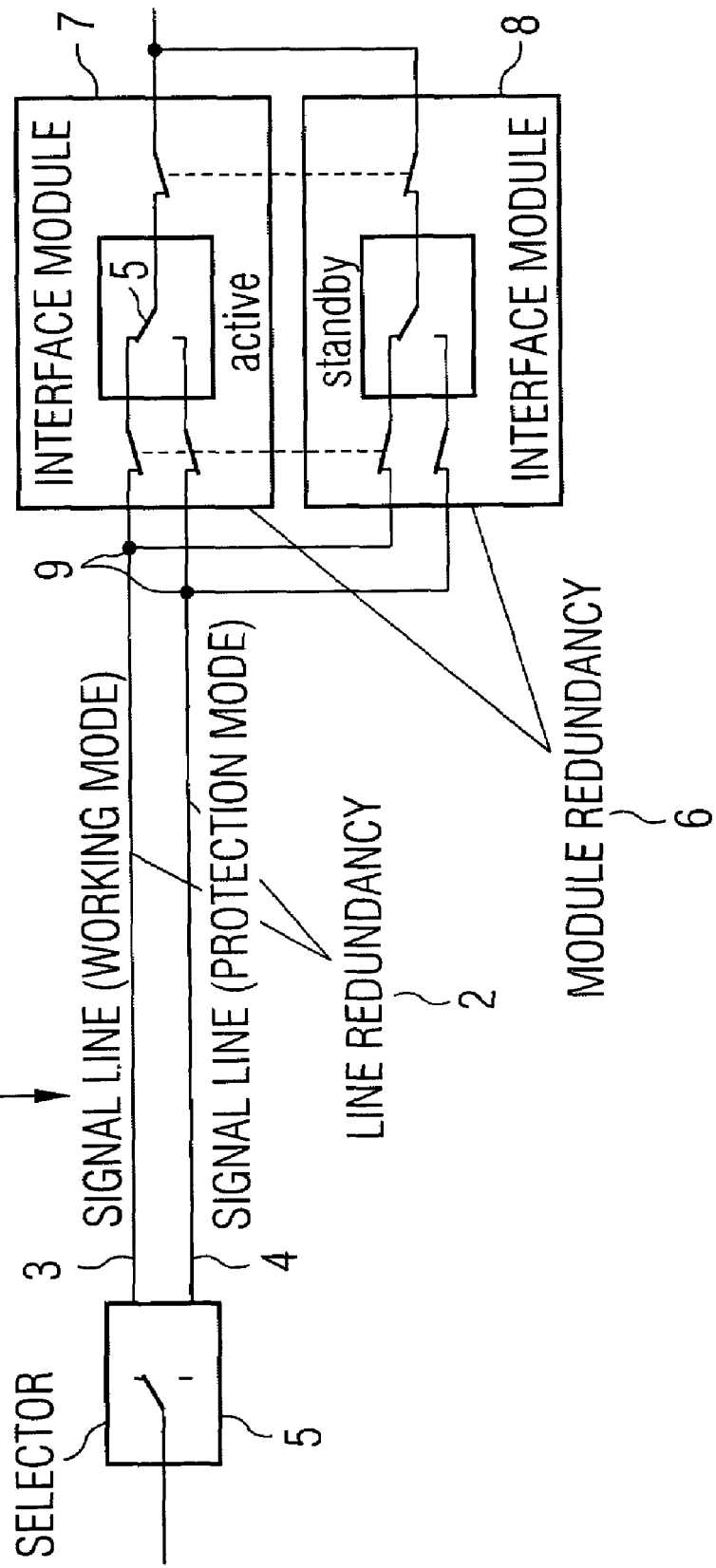

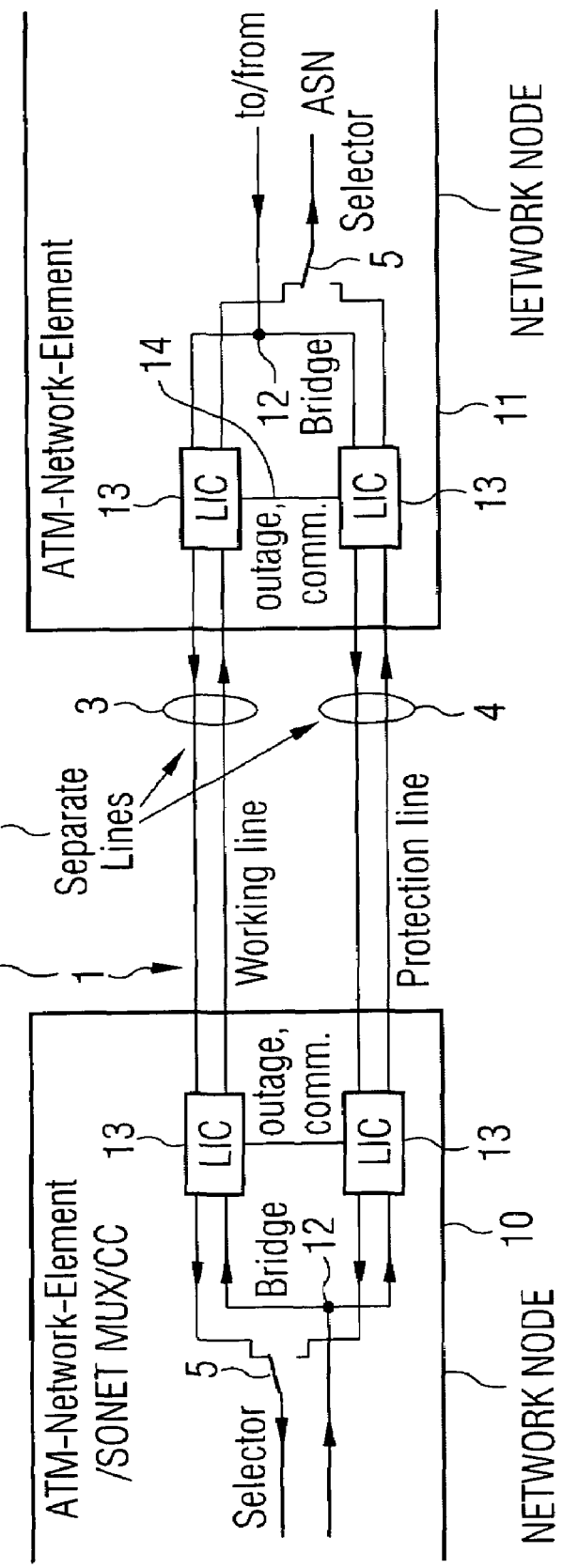

METHOD AND DEVICE FOR OPTIMIZING THE TRANSMISSION SAFETY AND THE DEFECT TOLERANCE IN HIGH-BIT-RATE DATA NETWORKS

BACKGROUND OF THE INVENTION

1. Field of the Invention

The invention relates to a method and an apparatus for optimizing transmission security and failure security in high-bit-rate data networks by means of signal line redundancy between the network nodes, whereby parallel signal lines can optionally be occupied, or can be switched, as working lines or protection lines.

2. Description of the Related Art

Increasing quantities of data to be transmitted and higher demands on transmission security in networks have led to the development of special error-tolerant data transmission protocols and to the provision of line redundancies in order to maintain a desired degree of functioning within a network, via modified transmission paths, in case of hardware or line failures.

The principle of the provision of line redundancies for the maintenance of error-tolerant data transmission networks has long been known, whereby faulty nodes or line segments can be circumvented by the network itself, corresponding to its provided structure, by means of flexible modification of transmission paths.

In the case in which fiber optic transmission paths, i.e., light waveguides, are used, for the signal changeover it is necessary to use optical switching units and multiplexers, but also couplers and splitters. As is known, however, such modules not only result in an increase in the costs in the creation of the network, or, in the operation of such a network, but undesired attenuations, and thereby signal losses, caused by a worsening of the signal-noise ratio also occur.

In order to avoid standby functions of protective means, including redundant line routing, network structures have been designed that are distinguished by a dynamic selection of connections between the nodes and a correspondingly constructed architecture. However, problems are found here in the necessary centralized or distributed control system that monitors the individual nodes and lines with respect to the desired transmission characteristics, in order to determine a new connection path in case of failure.

For this reason, on the basis of previously introduced data networks, line redundancy mechanisms, in connection with corresponding data transmission protocols, continue to be used for high-bit-rate transmissions, for example via a multilayer network of the type SONET (Synchronous Optical Network), due to the high demands on availability provided there.

With respect to the line redundancy, it is true that in addition to the actually required signal lines additional lines are also operated in parallel.

What is known as 1+1 line redundancy is widely used, in which the same data transmission quantity or load is sent via two signal lines, and whereby at the receive side in the respective node one of the two lines is used for the further processing of incoming items of information.

In such 1+1 line redundancies, and in an accordingly constructed architecture, signals of the working channel are supplied to a working line and to a protection line via a permanently effective bridge circuit. Both lines accordingly transmit the same signal or, the same quantity of data, and the respective nodes are in a position to select the signal from one of the two lines via what is known as a selector.

In the terminal nodes, what is known as an automatic protection switching (APS) can then be carried out, whereby in each node, corresponding to the received quality of signals via the two lines, the optimal signal is recognized and the respective line is defined as a working line or working channel.

In the case of a recognized error on the momentary working line, a changeover to the protection line is carried out via the selectors that are provided in each of the nodes.

In the case of what is known as 1:1 line redundancy, the protection line is used to transmit items of information having lower priority; i.e., in contrast to 1+1 line redundancy, the quantity of information or data is not constantly given on the working and protective line via the bridge circuit. In the case of 1:1 line redundancy, this bridge function is put into operation only when error functions are present.

If, taking into account the mentioned availability demands and the data transmission security, recourse is had to line redundancies in networks, then the corresponding interface modules must also be present redundantly in a consistent manner, whereby there must be a possibility, given a recognized defect of the active interface module, to change over to an additional module present in standby operation.

As FIG. 1 shows, as a schematic representation of a known module redundancy, a standby interface module must accordingly be arranged parallel to the active interface module, whereby corresponding couplers to the working and protection line terminal are necessary.

According to FIG. 1, the respective active module terminates the line redundancy, whereby the standby group is then in a position to take over the traffic if the active module fails. The previously active module is then accordingly separated from the line, and the standby group takes over its function by closing of the indicated switch.

The reference EP 0 824 292 A2 relates to a protective switch apparatus for an asynchronous transfer mode connection and a method therefor, in which the protective switch architecture consists of a virtual path group source node, a virtual path group sink node, and an arbitrary number of virtual path group intermediate nodes for the support of the virtual path group. The source node and the sink node are connected by a working line and a protection line, via the intermediate nodes. However, the arrangement shown herein does not comprise two network nodes each having at least two interface modules in which each interface module is respectively connected with a signal line pair for incoming or, outgoing signal lines. Two interface modules, arranged in parallel, within a network node, which always contain data or items of information that are transmitted via the signal lines—i.e., both are active—likewise cannot be learned from the content of this reference.

The disadvantage of the known module redundancy consists in the necessity of providing couplers or, modules for signal splitting, and the associated inherent higher expense or, occurrent signal attenuation. Another disadvantage is that the interface modules, operated either in active mode or in standby mode, require changeover switches for the termination of the respective line, resulting in signal falsifications during the actual changeover process. The interface modules, for example in the case of optical transmission networks, also present a significant cost factor, which increases further if recourse is had to the known solution of the parallel arrangement of modules with the possibility of changeover.

The reference JP-A-9 098 181 relates to a transmitter having a time switch array that, by means of cross connection of an active and a reserve channel, forms a bidirectional transmission network. The respective channel in which an error message occurs is redirected to a reserve channel via switching and bridge means, whereby a bypass for the channel is formed in the network. In addition, two separate transition units are provided for the transmission of signals on the protection line, in the forward direction and in the backward direction. As soon as an error is detected in the transmission lines by an error detection unit 38, the corresponding channel is redirected from the working line to the protection line. From this arrangement it cannot be learned that two interface modules, arranged in parallel, within a network node is equipped with a pair of signal lines for incoming or, outgoing signal lines, and both interface modules within a node always contain, by means of a bridge circuit, the data or items of information that are transmitted via the signal lines.

SUMMARY OF THE INVENTION

The object of the invention is therefore to indicate a method and an apparatus for optimizing the transmission security and failure security in high-bit-rate data networks by means of signal line redundancy between the network nodes, whereby, in a known manner, parallel signal lines can optionally be occupied, or can be switched, as working lines (Working mode) or protection lines (Protective mode) this however being enabled not only given the occurrence of a line error, but also given the occurrence of a failure of an interface module.

The object of the invention is achieved with a method and apparatus wherein two interface modules are provided in every node of the network. Upon a failure of any of any of these interface units, a signal line change over occurs. Likewise, a failure of a line transmission is countered through the already operating additional interface module.

According to the basic idea of the invention, the previously discretely converted module and line redundancy is combined and unified, it being here understood that, with respect to the handling of errors, the interface modules are to be regarded as part of the line. A failure of the interface modules is accordingly handled by changing over between a working or a protection line. Due to the fact that the interface modules are present in parallel and these parallel modules are constantly active, given the occurrence of a line error only one quasi-changeover is possible, using the selectors that are present anyway, with the omission of additional changeover switches present in the interface module.

According to the invention, each of the parallel signal lines is accordingly terminated at the network node side with an interface module, whereby, as shown, in the normal case all interface modules are in the active state.

Upon failure of one of the interface modules, this failure is countered by a quasi-virtual signal line changeover. The provided interface module redundancy therefore immediately effects an increased degree of security in the case of line errors, whereby in addition error messages can be transmitted between the interface modules of the incoming or outgoing parallel signal lines in each of the network nodes, via a corresponding link.

At the side of the apparatus, given standard line redundancy each network node therefore comprises at least two interface modules, each being connected with a signal line pair for incoming and outgoing lines or, data or items of information. A hardware connection, in the sense of the above-mentioned error message link, is provided between the interface modules.

Data coming from a standard processing unit are routed to both interface modules via a known bridge circuit, analogously to the 1+1 line redundancy, and at the output side of the interface modules incoming data or items of information reach the processing unit by means of a selector (likewise known).

Both interface modules of each network node are constantly active, whereby given line errors, or also in case of errors in the interface modules, a line selection between the working line or the protection line is carried out via the selectors, by means of a changeover thereof.

BRIEF DESCRIPTION OF THE DRAWINGS

FIG. 1 shows a block switching diagram of a known module redundancy through parallel arrangement of a standby interface module.

FIG. 2 shows a block switching diagram of a schematic view of the inventive apparatus of interface modules operated in parallel and in the active state in the respective network nodes.

DETAILED DESCRIPTION OF THE PREFERRED EMBODIMENTS

FIG. 1 represents a signal transmission path 1 of a network. The signal transmission path 1 comprises a line redundancy 2, namely a signal line Working 3 and a signal line Protection 4.

In the depicted state, the signal line Working 3 is active via the selector 5. This line is accordingly used for the bidirectional transmission of data or, items of information between nodes (not shown) of the network.

A module redundancy 6 comprises a first interface module 7 and a second interface module 8. With its inputs, the second interface module 8 is connected via couplers 9 to the signal line Working 3 and to the signal line Protection 4. By means of an output-side combination of the first and second interface modules 7, 8, there results a parallel circuit of the two, which is however fashioned such that in the depicted state only the first interface module 7 is active.

The second interface module 8 is in the standby state. The second interface module 8, in the standby state, is then capable of taking over the traffic if the active module, i.e. the first interface module 7, fails. Accordingly, the second interface module 8 is reserved for the failure of the first interface module 7, and there results in principle the problem of an undesired attenuation of data that are transmitted via the signal line path 1 and that reach the signal coupler or, splitting module 9.

In the exemplary embodiment according to FIG. 2, a signal transmission path 1 is in turn depicted that connects a first node 10 with a second node 11 of a network.

In analogy to the 1+1 line redundancy, in each node a hardware module is provided comprising selectors 5 and a bridge 12. Incoming signals, symbolized by arrows, thus reach the bridge circuits 12 as well as two interface modules 13 provided there. An error transmission link 14 is provided between the interface modules 13. Incoming signals to the respective node 10 and 11 are routed to the selector 5, which selects one of the present separate lines and defines this line as a working line.

As can be seen from FIG. 2, at the output side the interface modules 13 are routed to the existing line redundancy 2 and in principle are operated in parallel. That is, in normal operation all interface modules 13 are in the active state.

Thus, according to the exemplary embodiment an interface module redundancy and a line redundancy are unified, i.e., with respect to the sought error tolerance the interface modules are regarded as a part of the line. Given failure of one of the interface modules, this failure is handled by a line changeover, using the selectors 5 in the nodes 10, 11.

If a line error is present, in view of the module redundancy 6 shown in FIG. 1 it is now not necessary to activate a standby module; rather, due to the fact that in principle both the first and the second interface modules 7, 8 are active, only a quasi-changeover is carried out. Accordingly, in comparison with known constructions having the same hardware outlay, twice as many signal lines can be operated, whereby the selectors of the 1+1 line redundancy architecture take over the function of the switches (which would otherwise become necessary) in the interface modules according to the prior art. Couplers or signal splitting modules in the signal lines can be omitted.

It has turned out that the solution specified by the above exemplary embodiment can easily be implemented in high-bit-rate SDH/SONET transmission apparatuses, whereby the changeover time in case of error is around 50 milliseconds. The specified 1+1 ACT/ACT redundancy accordingly offers a combined possibility of signal line protection and module protection, so that transmission security and failure security in the data network are correspondingly increased.

Although other modifications and changes may be suggested by those skilled in the art, it is the intention of the inventors to embody within the patent warranted hereon all changes and modifications as reasonably and properly come within the scope of their contribution to the art.

We claim:

1. A method for optimizing transmission security and failure security in high-bit-rate data networks via signal line redundancy between network nodes such that parallel signal lines are capable of at least one of being occupied and being switched to at least one of a working mode and a protection mode, wherein selectors, bridge circuits and interface modules are respectively provided at the network node side, each of the parallel signal lines is terminated at the network node side with a respective interface module, thereby creating an interface module redundancy, and each interface module is in an active state, comprising:

immediately countering a failure of one of the interface modules by signal line switching with a switching time of approximately 50 ms;

immediately countering a line error by the interface module redundancy; and transmitting error messages between the respective interface modules of the parallel signal lines in each of the network nodes, wherein the bridge circuit ensures that the interface modules, of which there are at least two, of each network node always contain data and information which is to be transmitted via the signal lines.

2. A method according to claim 1, wherein the interface modules are regarded as line components of the respective signal lines to be selected, and incoming data is forwarded by the selector.

3. An apparatus for optimizing transmission security and failure security in high-bit-rate data networks via signal line redundancy between network nodes, comprising:

parallel signal lines capable of at least one of being occupied and being switched to at least one of a working line and a protection line;

selectors, bridge circuits and interface modules respectively provided at a network node side, where each network node includes at least two interface modules respectively connected with a signal line pair for incoming and outgoing lines, wherein the interface modules always contain data and information which is to be transmitted via the parallel signal lines;

an error message link provided between the interface modules of a network node; and a processing unit for routing data to the at least two interface modules via the bridge circuit, wherein the processing unit receives data from an output side of the interface modules via the selector, wherein the interface modules of each network node are active, and the selectors immediately perform line switching between a working line and a protection line, with a switching time of approximately 50 ms, in the case of line errors or interface module errors.

* * * * *